(12) United States Patent
Barth et al.

(10) Patent No.: US 8,979,335 B2
(45) Date of Patent: Mar. 17, 2015

(54) HEADLIGHT SYSTEM FOR A MOTOR VEHICLE

(71) Applicant: GM Global Technology Operations LLC, Detroit, MI (US)

(72) Inventors: Andreas Barth, Ludwigsburg (DE); Frank Langkabel, Ruesselsheim (DE); Ingolf Schneider, Ruesselsheim (DE); Justus Illium, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 63 days.

(21) Appl. No.: 13/938,752

(22) Filed: Jul. 10, 2013

(65) Prior Publication Data

US 2014/0016334 A1 Jan. 16, 2014

(30) Foreign Application Priority Data

Jul. 11, 2012 (DE) .......................... 10 2012 013 730

(51) Int. Cl.
*B60Q 1/00* (2006.01)
*B60Q 1/08* (2006.01)
*B60Q 1/06* (2006.01)
*B60Q 1/12* (2006.01)
*B60Q 1/14* (2006.01)
*F21S 8/10* (2006.01)

(52) U.S. Cl.
CPC *B60Q 1/085* (2013.01); *B60Q 1/06* (2013.01); *B60Q 1/12* (2013.01); *B60Q 1/143* (2013.01); *F21S 48/1747* (2013.01); *F21S 48/1757* (2013.01); *F21S 48/1789* (2013.01); *B60Q 2300/056* (2013.01); *B60Q 2300/45* (2013.01)
USPC .......................... 362/466; 362/464; 362/465

(58) Field of Classification Search
CPC ............. B60Q 1/06; B60Q 1/085; B60Q 1/12
USPC ........................................ 362/464, 465, 466
See application file for complete search history.

(56) References Cited

U.S. PATENT DOCUMENTS

| | | | | |
|---|---|---|---|---|
| 7,824,085 B2 * | 11/2010 | Watanabe | ...................... | 362/466 |
| 8,246,210 B2 * | 8/2012 | Angelini et al. | .............. | 362/279 |
| 8,287,163 B2 * | 10/2012 | Watanabe et al. | .............. | 362/466 |
| 8,465,187 B2 | 6/2013 | Buchberger et al. | | |
| 2007/0041207 A1 * | 2/2007 | Ishida | ........................... | 362/538 |
| 2007/0147055 A1 * | 6/2007 | Komatsu | ....................... | 362/464 |
| 2012/0229028 A1 | 9/2012 | Ackermann et al. | | |
| 2012/0275173 A1 | 11/2012 | Hamm et al. | | |
| 2013/0021816 A1 | 1/2013 | Ehm | | |

FOREIGN PATENT DOCUMENTS

DE 102009051485 A1 6/2010
DE 202010006097 U1 8/2010

OTHER PUBLICATIONS

German Patent Office, German Search Report for Application No. 102012013730.3, dated Mar. 7, 2013.

* cited by examiner

*Primary Examiner* — Ali Alavi
(74) *Attorney, Agent, or Firm* — Ingrassia Fisher & Lorenz, P.C.

(57) ABSTRACT

A headlight system is provided for a motor vehicle and includes, but is not limited to at least one light source and beam-forming apparatus for generating the main light beam with an essentially horizontal cut-off line and a marker light beam within a limited azimuth angle range above the cut-off line of the main light beam. The beam-forming apparatus are switchable between at least two stationary states that differ from each other in the progression of an upper cut-off line of the marker light beam.

16 Claims, 3 Drawing Sheets

HEADLIGHT SYSTEM FOR A MOTOR VEHICLE

CROSS-REFERENCE TO RELATED APPLICATION

This application claims priority to German Patent Application No. 10 2012 013 730.3, filed Jul. 11, 2012, which is incorporated herein by reference in its entirety.

TECHNICAL FIELD

The technical field relates to a headlight system for a motor vehicle with which a so-called marker light can be generated.

BACKGROUND

Headlight systems for motor vehicles which support two operating states suitable for use on the moving vehicle, i.e., full beam and dipped beam, have been known for decades. In the full-beam mode a more widely fanned light beam is emitted, in which not only the carriageway in front of the vehicle but also objects above the carriageway or on the edge of the carriageway are clearly recognizable, which however has the disadvantage that oncoming traffic users are blinded. The dipped beam is essentially aimed only at the carriageway, thereby avoiding blinding the oncoming traffic but restricting recognition of objects that are directly on the carriageway surface.

In order to improve perceptibility of such objects headlight systems have been proposed in later years that additionally support a marker light, i.e., a normally narrowly limited light beam with which objects recorded in the vicinity of the vehicle can be specifically illuminated so as to alert the driver to their presence, or so as to enable him to quickly and reliably identify these objects. The DE 10 2009 035 743 A1 in particular has, for example, revealed a headlight system with a light source and beam-forming apparatus in the form of movable apertures, which permits generation of the main light beam with an essentially horizontal cut-off line and at the same time permits the generation of a marker light beam within a limited azimuth angle range above the cut-off line of the main light beam. One of these apertures comprises a horizontal edge with a notch formed therein, where light incident through the notch forms the marker light. The broader the notch and the marker light beam defined by it, in particular in a vertical direction, the quicker and more reliably the driver can recognize the marked object. It is undesirable for the person misinterprets the marker light beam as a sign of the driver that he/she has been seen and can cross the carriageway.

It is at least one object to indicate a motor vehicle that on the one hand is able to generate a vertically extended marker light beam that enables the driver of the motor vehicle to quickly and reliably perceive an object illuminated by the marker light beam, but which on the other hand limits undesirable effects caused the marker light beam. In addition, other objects, desirable features, and characteristics will become apparent from the subsequent summary and detailed description, and the appended claims, taken in conjunction with the accompanying drawings and this background.

SUMMARY

A headlight system is provided for a motor vehicle with at least one light source and beam-forming apparatus for generating a main light beam with an essentially horizontal cut-off line and a marker light beam in a limited azimuth angle range above the cut-off line of the main light beam, the beam-forming apparatus can be switched between at least two stationary states that differ from each other in the progression of an upper cut-off line of the marker light beam. Due to the fact that the cut-off line of the marker light beam passes below head height of an illuminated person, undesirable effects of the marker light beam can be avoided. Even if the respective person perceives that part of his/her body is hit by the light, the source of this light cannot be determined by him/her as long as the marker light beam does not hit the eyes. Therefore the light, by which such a person is hit, cannot be associated by this person with a particular motor vehicle, and this person can therefore not erroneously deduce that the light represents a signal for him/her.

According to a first design of the invention the headlight systems can comprise a plurality of light sources switchable by the beam-forming apparatus, of which at least two contribute to the marker light beam. Due to the fact that, in the first stationary state, these at least two light sources are switched on, an object can be extensively marked; in that if, provided the object to be marked is a person, at least one light source of the at least two light sources is switched off, the head of that person can be kept un-illuminated so that the marker light beam is not noticed by the marked person or at least its origin is not recognizable by the person. With this design the beam-forming apparatus are of an essentially electric or electronic nature.

According to a second design the beam-forming apparatus comprise at least one first movable aperture which is held in respectively different positions in the first and second stationary states. Further the beam-forming apparatus may comprise a second aperture that defines an elongated edge that in at least the first and second stationary states defines the cut-off line of the main light beam, and also comprise an opening cut out adjacent to the edge and limiting the marker light beam. Preferably this opening is a notch open towards the edge in the second aperture.

In order to avoid that the head of a person is illuminated, the first aperture may cover part of the opening of the second aperture in the second stationary state. In case the first aperture covers part of the opening also in the first stationary state, the coverage in the second stationary state is greater than in the first. According to a further embodiment the first aperture may comprise a point, which protrudes into the opening in the second stationary state. In this way in particular, a cross-section of the marker light beam can be generated which albeit leaves the head of a person in the dark, but still illuminates the environment to the right and left of the head. In a third stationary state of the headlight system, in particular if no marker light is to be emitted, the first aperture can completely cover the opening.

According to a convenient further development the second aperture is also movable. In the above mentioned three stationary states the position of the second aperture may always be the same. Preferably, due to the movement of the second aperture, the cut-off line of the main light beam is movable, in particular in order to switch between dipped beam and full beam.

In order to start a movement of the first aperture this may be coupled to a motion link that is driven by a cam which is moved in an oscillating manner. The same cam or a second cam which is moved because it is coupled thereto may interact with a motion link of the second aperture if this also is movable, as mentioned above.

In order to be able to align the marker light beam with an object in the environment of the vehicle, it is preferred that the beam-forming apparatus form an assembly which is pivotable at least in azimuthal direction. Preferably the at least one light source belongs to such an assembly.

Preferably the system further comprises an environmental sensor such as a camera and an evaluation and control unit connected with the environmental sensor for selecting between at least the first and second stationary state based on information of the environmental sensor. The evaluation and control unit may be a microprocessor, in particular, on which an image evaluation program is executed for identifying persons and other objects to the marked, if required. The evaluation and control unit may be adapted to control a pivotal movement of the assembly based on information of the environmental sensor, in particular in order to align the marker beam with an object identified based on the information of the environmental sensor. The evaluation and control unit may further be conveniently coupled to a vehicle steering system in order to pivot the assembly coupled to the steering at times when the evaluation and control unit does not record an object to be illuminated by the marker light beam.

In order to be able to make a meaningful decision whether the first or the second stationary state shall be set, the evaluation and control unit should be able to classify an object recorded by the environmental sensor. The classification may include differentiating between humans on the one hand and animals and lifeless objects on the other, but a classification is also feasible between live and lifeless objects so that animals on the edge of the road, if possible, are not irritated by the marker light beam.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
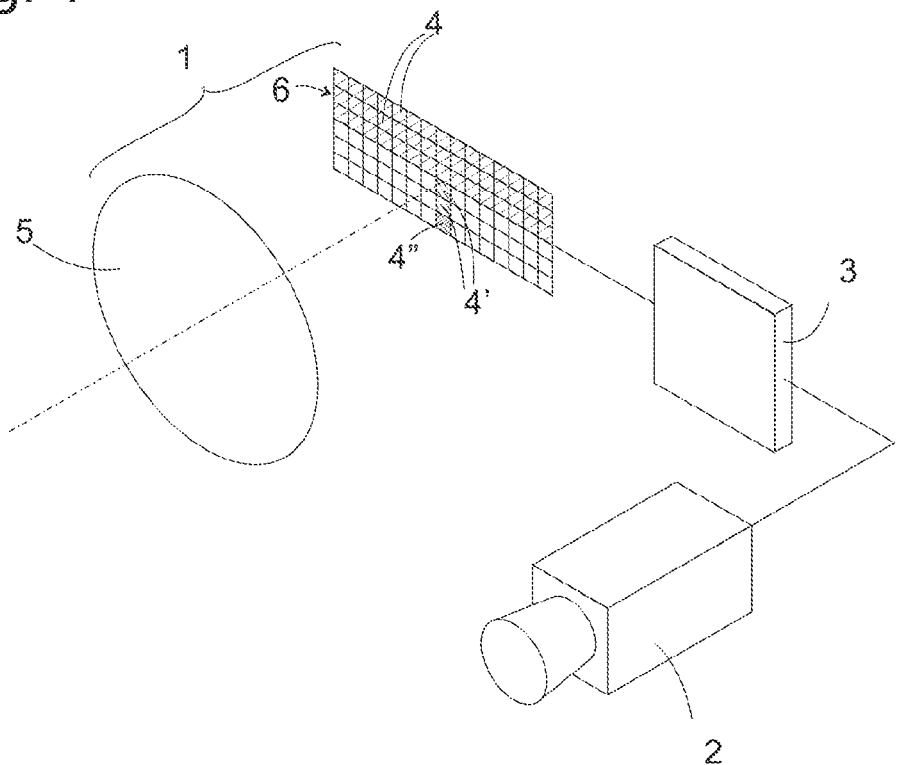
FIG. 1 shows a schematic illustration of a headlight system according to a first embodiment with electronic beam-forming apparatus.

The schematically shown headlight system of FIG. 1 comprises two front headlights 1 for a motor vehicle that are configured to be essentially identical or mirror-inverted relative to each other and of which, for reasons of simplicity only one is shown, an environmental sensor such as an electronic camera 2 or a radar system and a microprocessor 3. The front headlights 1 and the camera 2 are mounted in a motor vehicle in the usual way such that they illuminate/record the environment in front of the vehicle.

The front headlight 1 is comprised of a plurality of light sources arranged in a two-dimensional matrix, in particular of white light LEDs 4, as well as a lens 5 or lens array arranged in front of the LEDs 4 in order to map their matrix upon the environment in front of the vehicle. The microprocessor 3 controls the operation of the LEDs 4. Its supports a full-beam operating mode, in which all LEDs 4 of the matrix spread their light widely across the carriageway and the environment, and a dipped-beam mode in which only LEDs 4 in an upper loosely hatched area 6 of the matrix are in operation, in order to illuminate the carriageway in front of the vehicle, but not to emit any upwardly directed light which could blind oncoming traffic.

Figure 2:
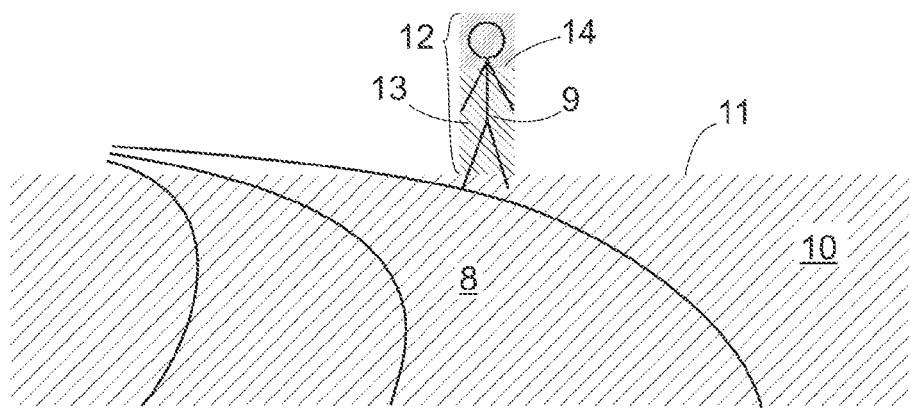
FIG. 2 shows a schematic illustration of a scenery illuminated by the headlight system.

The camera 2 continuously supplies pictures of the carriageway in front of the vehicle and the close environment to the microprocessor 3. FIG. 2 schematically shows such a picture with a carriageway 8 stretching in front of the vehicle and a person 9 standing by the side of the road. Due to the picture-reversing effect of the lens the LEDs of area 6 illuminate one half of the picture below the horizon, as symbolized by the hatched areas in FIG. 1 and FIG. 2 corresponding with each other, i.e., they generate a dipped-beam 10 with an upper cut-off line 11 which in the representation in FIG. 2 extends just below the horizon.

The microprocessor 3 applies to the pictures supplied by the camera 2 a picture analysis process that is known as such and will therefore not be described in any detail, in order to identify potentially safety-relevant objects on or near the carriageway, in particular objects without their own light source which can easily be overlooked by the driver of the vehicle. When such an object is identified, the microprocessor 3 also decides whether the identified object is a person 9 or not. If it is decided that the object is not a person, the microprocessor 3 selects a small group of LEDs, marked 4' and 4", from the area 7 of the matrix normally switched-off in dipped-beam mode, which are positioned in the matrix in such a way that they are mapped by the lens 5 onto the identified object. If these LEDs 4' and 4" are switched on, they generate a marker light beam 12, with which the identified object, depending upon size, is fully or at least for a large part, illuminated. When the identified object suddenly lights up, the driver's attention is drawn to it enabling him/her to identify and, if necessary, maneuver it in such a way as to avoid a danger created by the object.

If the microprocessor 3 decides that the identified object is a person 9, the LEDs furthest away from the area 6, i.e., those 4" LEDs of the LEDs 4' and 4" which, if they were switched on, would hit the head of the person, remain switched off. Thus a marker light beam 13 of reduced cross-section is obtained the upper cut-off line 14 of which passes over the body of the identified person so that the legs and possibly the abdomen is illuminated, but the head of the person 9 remains in the dark.

Figure 3:
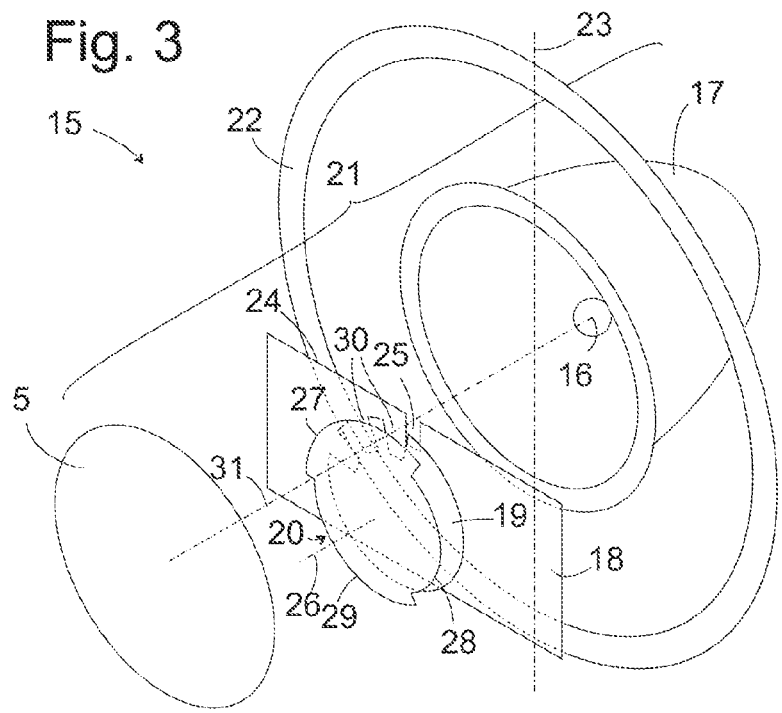
FIG. 3 shows a first embodiment of a headlight system with mechanical beam-forming apparatus.

FIG. 3 is a schematic illustration of a front headlight 15 according to a second embodiment. This front headlight comprises a single light source such as a halogen lamp 16, a reflector 17 that bundles the light of the halogen lamp 16 to form a forward facing beam, a lens 5 and a plurality of apertures 18, 19, 20 movably arranged between the lamp 16 and the lens 5. Motors driving the movement of the apertures 18, 19, 20 are not shown in the figure. They are subject to the control by a microprocessor 3 not shown in the figure, which as described with reference to FIG. 1, receives pictures of the environment of the camera 2, in order to identify, as required, safety-relevant objects in these pictures and to decide whether the objects are persons or not.

The lamp 16, the reflector 17, the lens 5 and the motors of the apertures 18, 19, 20 are mounted in a frame not shown in FIG. 2 for reasons of clarity and thus form an assembly 21 that with respect to the built-in frame fixed to the vehicle, schematically shown here as ring 22, is azimuthally pivotable about an axis 23. A further motor that drives the pivotal movement of the assembly 21 about axis 23 is also controlled by the microprocessor 3.

In the position shown in FIG. 2 the aperture 18 covers the lower half of the reflector 17. Light which passes above the aperture 18 is deflected by the lens 5 obliquely downwards in direction of the carriageway, thus, as shown in the illustration in FIG. 2, forming the dipped-beam 10, the cut-off line 11 of which is defined here by an upper edge 24 of the aperture 18. A notch 25 at the edge 24 is covered in the configuration of FIG. 2 by an aperture 20 rotatable about an axis 26. The aperture 20 comprises three circle segments 27, 28, 29 with different radii. The circle segment 27 facing upwards in the configuration of FIG. 2 is the segment with the largest radius. If the circle segment 28 with the smallest radius is rotated upwards, the aperture 20 exposes the notch 25; if the circle segment 29 with the medium radius is rotated upwards, the notch 25 is partially covered. The aperture 19 is a circular disc also rotatable about axis 26, into which notches 30 are cut over a part of its circumference.

When the microprocessor 3 identifies an object to be marked that is potentially safety-relevant, it initially controls the motor of assembly 21 in order to align the optical axis 31 with the object. Depending on whether the object has been identified as a person or not, the microprocessor controls a motor of the aperture 20 in order to position the segment 29 or 28 in front of the notch 25. If subsequently the aperture 19 is rotated once about axis 26, the identified object is hit by the marker light beam as often as corresponds to the number of notches 30 of aperture 19. As with the construction shown in FIG. 1, the marker light beam can be emitted in a spatial angle not illuminated by the dipped beam. The circle segment, which is positioned in front of the notch 25, i.e., circle segment 28 or circle segment 29, determines whether it is the marker light beam 12 or the marker light beam 13 that is generated with a cut-off line 14 below head height of the marked person.

Figure 4:
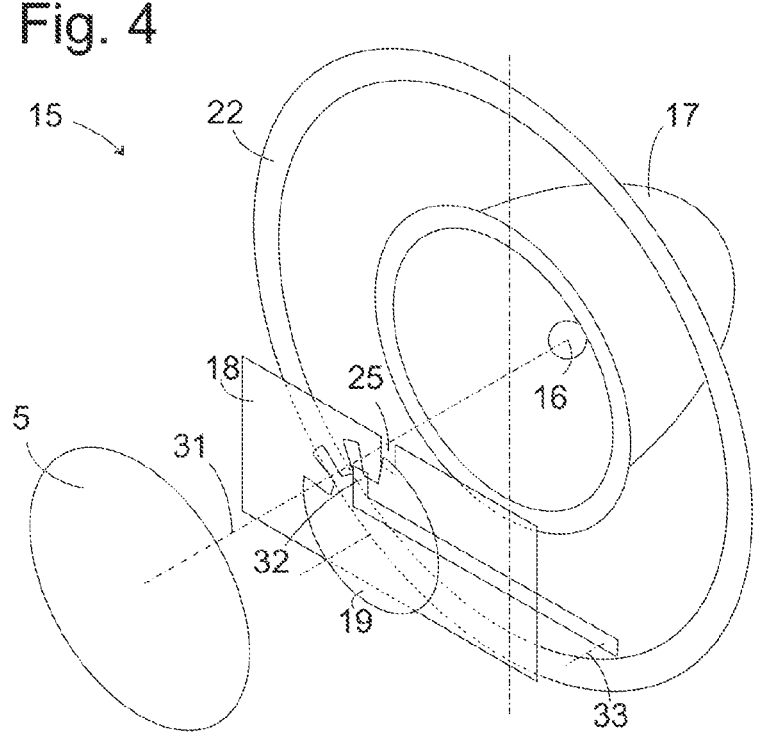
FIG. 4 shows a second embodiment of the headlight system with mechanical beam-forming apparatus.

FIG. 4 shows a variation of the design of FIG. 3 in which the rotatable aperture 20 is replaced by a platelet-shaped aperture 32 that is essentially vertically movable by pivoting it about a laterally offset axis 33. FIG. 4*a* shows the apertures 18, 19, 32 of this variation in a frontal view along optical axis 31. The aperture 32 is movable between the positions shown in FIG. 4*a*, in which it covers a lower area of the notch 25, and a lowered position, in which it completely exposes the notch 25. In the lowered position of the aperture 32 the light passing through the notch 25 results, in the open space in front of the front headlight, in the marker light beam 12 the vertical extension of which would suffice to illuminate a person from head to toe on the edge of the carriageway. If, however, the microprocessor 3 records such a person 9 it positions the aperture 32 in the indicated position, in which it omits the head of the person and in which the height-reduced marker light beam 13 which is generated.

Figure 5A:
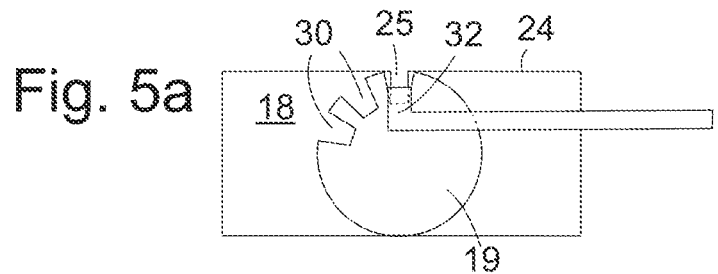
FIG. 5a-c show variants of the headlight system of FIG. 4.
Figure 5B:
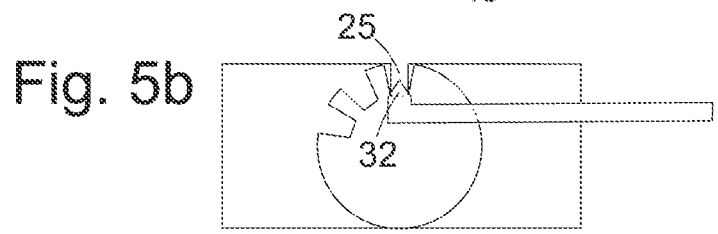
Figure 5C:
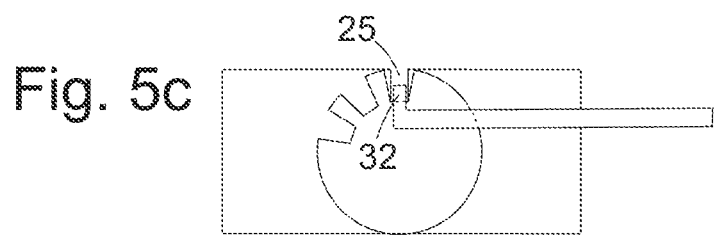

In the design of FIG. 4 and FIG. 5*a* the aperture 32 is wider than the notch 25 so that it completely covers the latter in its lower area. As can be seen in FIG. 5*b* or FIG. 5*c*, the aperture 32 may also be tapered or be narrower than the notch 25, so that light is still allowed to pass laterally of the aperture 32, but the head of a person which is aligned with the optical axis 31 of the headlight, remains in shadow. As long as the microprocessor 3 does not recognize an object to be marked in the environment of the vehicle, the aperture 19 is turned such that a portion of its circumference which is free of notches 30 covers the notch 25 so that no marker light beam is generated.

Figure 6:
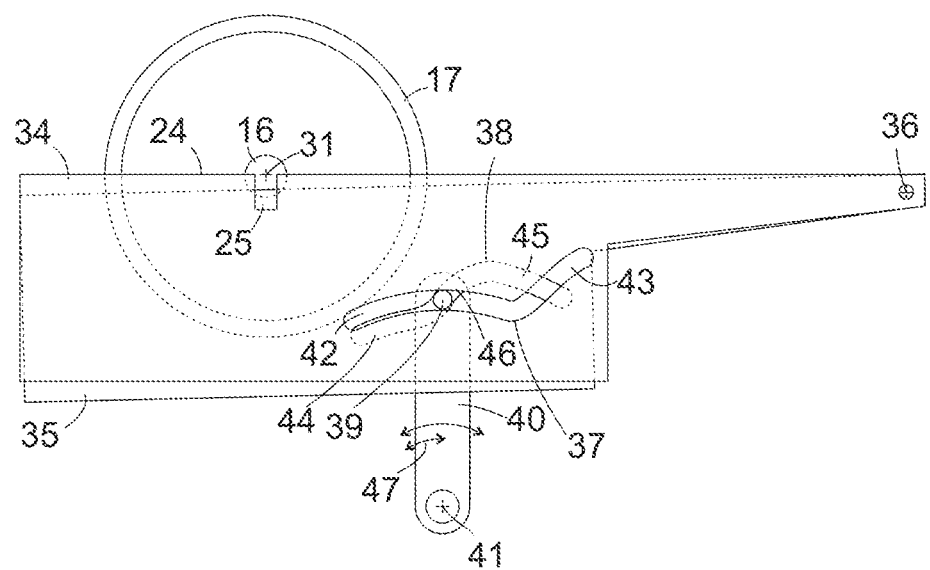
FIG. 6 shows a third embodiment of the headlight system with mechanical beam-forming apparatus.

FIG. 6 shows a front headlight 15 according to a further embodiment in a schematic frontal view along the optical axis 31. The halogen lamp 16 and the reflector 17 are the same as in FIG. 2 and FIG. 3, and also the picture-inverting lens 5 are present and are connected with the lamp 16 via a pivotably suspended frame and the front headlight 1, forming the assembly. Two apertures 34, 35 are pivotably mounted between the lamp 16 and the lens 5 about an axis 36 fixed to the frame. In both apertures 34, 35 a slot-shaped motion link 37, 38 is cut out, through which a cam 39 extends. The cam 39 is supported by an arm 40 which in turn can be driven by the motor about a further axis 41 fixed to the frame in order to perform pivotal movements.

One of the two apertures, here the aperture 34 facing the observer comprises a notch 25 on its upper edge. The other aperture 35 comprises an essentially straight upper edge and in the configuration shown in FIG. 5, covers a part of the notch 25 so that the light that passes through the part of the notch 25 that has remained open forms the marker light beam 13 that is suitable for marking persons.

The motion link 37 of the front aperture 34 comprises a concentric portion 42 with regard to axis 41 and a portion 43 extending away from axis 41. In the configuration of FIG. 2 the cam 39 is in a central position of the concentric portion 42 so that when the arm 40 performs a pivotal movement in which the cam 39 does not leave the portion 42, the aperture 34 remains immovable.

The motion link 38 of the rear aperture 35 comprises two concentric portions 44, 45 for different radii and a portion 46 connecting the concentric portions. In FIG. 2 the cam 39 is in this portion 46. When the arm 40 pivots anti-clockwise from the shown position, the aperture 35 is moved upwards until it completely covers the notch 25. In this position no marker light beam is generated. Hence the normal position, in which the cam 39 remains so long as no object to be marked is recorded, is the left end of the motion links 37, 38. When the microprocessor records a person to be marked, the arm 40 pivots once or twice for a short time from the normal position into the position shown in FIG. 2, as indicated by arrow 47. As long as it stays in the position of FIG. 6, the marker light beam 13 generated is the beam which is suitable for marking the person 9 and which omits the head of that person.

If, however, the object to be marked is not a person, the pivot arm 40 is driven out of the normal position to perform a more extensive pivotal movement, beyond the configuration shown in FIG. 6 and across the entire extension of the concentric portion 42, as symbolized by arrow 48. In this scenario, when the cam 39 reaches the concentric portion 45 of the motion link 38, the aperture 35 has been folded down to such an extent that it fully exposes the notch 25. If, however, the arm 40 is pivoted further in clockwise direction so that its cam 39 arrives at portion 43, then the aperture 34 too pivots downwards that corresponds to the headlight being switched over to a full-beam characteristic.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A headlight system for a motor vehicle, comprising:
   at least one light source;
   a beam-forming apparatus configured to generate a main light beam with an essentially horizontal cut-off line, the beam-forming apparatus having a first stationary state and a second stationary state that differ in a progression of the upper cut-off line of the main light beam; and
   a marker light beam within a limited azimuth angle range above the essentially horizontal cut-off line of the main light beam,
   wherein the beam-forming apparatus comprises at least two stationary states that differ in the progression of an upper cut-off line of the marker light beam.

2. The headlight system according to claim 1, further comprising at least two light sources contribute to the marker light beam,
   wherein the at least two light sources are switched on in the first stationary state and in the second stationary state at least one of the at least two light sources is switched on and at least one of the at least two light sources is switched off.

3. The headlight system according to claim 1, wherein the beam-forming apparatus encompass a first aperture that in the first stationary state and the second stationary state is held in different positions.

4. The headlight system according to claim 3, wherein the first aperture is coupled to a motion link that interacts with a cam driven in an oscillating manner.

5. The headlight system according to claim 3, wherein the beam-forming apparatus and the at least one light source form a pivotable assembly pivotable at least in an azimuthal direction.

6. The headlight system according to claim 5, further comprising an environmental sensor and an evaluation and control unit connected with the environmental sensor that is configured to select between at least the first stationary state and the second stationary state based on information from the environmental sensor.

7. The headlight system according to claim 6, wherein the evaluation and control unit is configured to control a pivotal movement of the pivotable assembly based on information from the environmental sensor.

8. The headlight system according to claim 7, wherein the evaluation and control unit is configured to align the marker light beam with an object recorded by the environmental sensor.

9. The headlight system according to claim 6, wherein the evaluation and control unit is configured to produce a classification of an object recorded by the environmental sensor and to select the first stationary state depending on the result of a classification.

10. The headlight system according to claim 6, wherein the evaluation and control unit is configured to classify an object recorded by the environmental sensor and to select the second stationary state depending on the result of a classification.

11. The headlight system according to claim 3, wherein the beam-forming apparatus further comprises a second aperture that defines an elongated edge, which at least in the first stationary state and the second stationary state defines the essentially horizontal cut-off line of the main light beam and an opening that is cut out adjacent to the elongated edge that limits the marker light beam.

12. The headlight system according to claim 11, wherein the first aperture covers part of the opening in the second stationary state.

13. The headlight system according to claim 11, wherein the first aperture comprises a point protruding into the opening in the second stationary state.

14. The headlight system according to claim 11, wherein the first aperture substantially covers the opening in a third stationary state.

15. The headlight system according to claim 11, wherein the second aperture is movable.

16. The headlight system according to claim 15, wherein a movement of the second aperture causes movement of the essentially horizontal cut-off line of the main light beam.

* * * * *